United States Patent
Gittinger et al.

(10) Patent No.: US 6,737,462 B2
(45) Date of Patent: May 18, 2004

(54) THERMALLY STABLE, WEATHER-RESISTANT POLYAMIDE MOULDING COMPOSITIONS

(75) Inventors: Andreas Gittinger, Krefeld (DE); Aziz El-Sayed, Leverkusen (DE); Edgar Ostlinning, Düsseldorf (DE); Ralf Lange, Krefeld (DE)

(73) Assignee: Bayer AG, Leverkusen (DE)

( * ) Notice: Subject to any disclaimer, the term of this patent is extended or adjusted under 35 U.S.C. 154(b) by 158 days.

(21) Appl. No.: 09/989,347

(22) Filed: Nov. 20, 2001

(65) Prior Publication Data

US 2002/0077403 A1 Jun. 20, 2002

Related U.S. Application Data

(63) Continuation of application No. 08/650,416, filed on May 20, 1996, now abandoned.

(30) Foreign Application Priority Data

May 31, 1995 (DE) .......................... 195 19 820

(51) Int. Cl.⁷ .............................. C08K 3/32; C08K 3/10; C08K 3/16
(52) U.S. Cl. ................. 524/414; 524/401; 524/435; 524/436
(58) Field of Search ................... 524/414, 435, 524/436, 401

(56) References Cited

U.S. PATENT DOCUMENTS

| | | | | |
|---|---|---|---|---|
| 2,510,777 A | * | 6/1950 | Gray ........................ | 524/414 |
| 2,705,227 A | | 3/1955 | Stamatoff .................. | 523/307 |
| 3,431,236 A | * | 3/1969 | Davenport et al. ......... | 523/347 |
| 3,519,595 A | * | 7/1970 | Hermann et al. ........... | 524/413 |
| 3,679,624 A | * | 7/1972 | Edgar et al. ................ | 524/707 |
| 3,691,131 A | * | 9/1972 | Kelmchuk ................... | 524/414 |
| 3,814,728 A | * | 6/1974 | Bostic et al. ............... | 427/393.3 |

FOREIGN PATENT DOCUMENTS

| | | |
|---|---|---|
| DE | 21 07 406 | 9/1971 |
| DE | 25 16 565 | 10/1976 |
| DE | 29 24 024 | 12/1979 |
| EP | 0 612 794 | 8/1994 |
| GB | 934513 | 8/1963 |
| GB | 1140047 | 1/1969 |

OTHER PUBLICATIONS

European Patent Search for EP 96 10 7971.
Kunststoffhandbuch Polyamide vol. 6, pp. 238–241 (1996).

* cited by examiner

Primary Examiner—Tae H. Yoon
(74) Attorney, Agent, or Firm—Connolly Bove Lodge & Hutz LLP

(57) ABSTRACT

The invention relates to thermally stable, weather-resistant polyamide moulding compositions containing as stabiliser, a mixture of a copper halide, one or more halogen compounds and hypophosphorous acid or an alkali metal or alkaline earth metal salt of this acid, wherein the individual components of the stabiliser mixture are added in an amount such that the molar amount of halogen contained in the moulding composition is greater than or equal to six times the molar amount of and less than or equal to fifteen times the molar amount of copper contained in the moulding composition and the molar amount of phosphorus is greater than or equal to the molar amount of and less than or equal to ten times the molar amount of copper contained in the moulding composition.

7 Claims, No Drawings

THERMALLY STABLE, WEATHER-RESISTANT POLYAMIDE MOULDING COMPOSITIONS

This is a continuation of patent application Ser. No. 08/650,416, filed May 20, 1996 abandoned.

The invention relates to thermally stable, weather-resistant polyamide moulding compositions. Stabilisation is achieved by the simultaneous presence of copper, one or more halogens and phosphorus in the moulding compositions.

Many systems are known for stabilising polyamide moulding compositions against thermo-oxidative or photo-oxidative degradation. A summary may be found in "Kunststoffhandbuch vol 4: Polyamide" (editors: R. Vieweg and A. Muller, Cad Hanser Verlag, Munich 1966) on pages 238 to 241. Known stabiliser systems include phenolic antioxidants, antioxidants based on aromatic amines and copper compounds. In particular, mixtures of copper halides and alkali metal halides have proved to be effective stabilisers against thermo-oxidative and photo-oxidative ageing. Mixtures of copper halides and alkali metal halides have superior stabilising properties to the other stabilising systems mentioned.

In addition to the systems mentioned, further mixtures of materials for stabilising polyamides against thermo-oxidative or photo-oxidative degradation have been described. U.S. Pat. No. 2,705,227 describes a ternary stabiliser system consisting of copper compound, a halogen compound and a phosphoric acid or an alkali metal phosphate.

British patent application 1 140 047 describes a ternary stabiliser system consisting of a copper salt, phosphorous or hypophosphorous acid or a compound of these acids and an alkali metal halide. The claimed ternary system is subject to the restriction that the maximum amount of phosphorus compound used is half the molar amount of the copper salt used. If the phosphorus compound is hypophosphorous acid, then according to British patent application 1 140 047, the maximum concentration of this is one quarter the molar concentration of the copper salt used. The phosphorus compound is added, in the molar shortfall cited with respect to the amount of copper added, in order to obtain polyamide moulding compositions with a pale colour.

German published patent application 2 107 406 describes a ternary stabiliser system consisting of copper stearate, potassium iodide and manganese hypophosphite. Moulding compositions stabilised with this mixture are described as colourless.

Known stabiliser systems delay the thermo-oxidative and photo-oxidative ageing of polyamide moulding compositions. New applications increase the demands on the stability of polyamide moulding compositions towards thermo-oxidative and photo-oxidative degradation. This applies, for instance, to the application of polyamide moulding compositions in the engine compartment of automobiles. In this and also in other areas, polyamide moulding compositions are subjected to intense thermal stress for long periods of time. Stabilisation which extends beyond that achievable with known stabiliser systems is therefore required.

It has now been found that polyamide moulding compositions with a stabiliser system of a mixture of a copper halide, a halogen compound and hypophos-phorous acid or an alkali metal or alkaline earth metal salt of this acid in a specific molar ratio to each other are highly stable towards thermo-oxidative and photo-oxidative ageing.

The invention provides thermoplastic polyamide moulding compositions containing, as stabiliser, a mixture of a copper halide, one or more halogen compounds, preferably sodium or potassium iodide and hypophosphprouso acid or an alkali metal or alkaline earth metal salt of this acid, wherein the individual components in the stabiliser mixture are added in amounts such that the molar amount of halogen contained in the moulding composition is greater than or equal to six times the molar amount of and less than or equal to fifteen times, preferably twelve times, the molar amount of copper contained in the moulding composition and the molar amount of phosphorus is greater than or equal to the molar amount of and less than or equal to ten times, preferably five times, the molar amount of copper contained in the moulding composition.

The invention also provides use of a mixture of a copper halide, one or more halogen compounds and hypophosphorous acid or an alkali metal or alkaline earth metal salt of this acid as stabiliser for polyamide compositions, characterised in that the molar amount of halogen contained in the moulding composition is greater than or equal to six times the molar amount of and less than or equal to fifteen times, preferably twelve times, the molar amount of copper contained and the molar amount of phosphorus contained in the moulding composition is greater than or equal to the molar amount of and less than or equal to ten times, preferably five times, the molar amount of copper contained.

The concentration of copper in the moulding composition is generally 0.001 to 1 wt. % (corresponding to 0.0157 to 15.7 mmol of copper), with respect to the weight of the total composition, i.e. the total composition is understood to be the polyamide including stabiliser and optionally added additives.

0.003 to 0.3 wt. % of copper (corresponding to 0.0472 to 4.72 mmol of copper) is preferably used.

Particularly preferably, 0.01 to 0.5 wt. % of copper(I) iodide, sodium or potassium iodide are added, wherein the total molar amount of iodine contained in the moulding composition corresponds to at least six times and at most twelve times the molar amount of copper contained in the moulding composition, and sodium hypophosphite or sodium hypophosphite monohydrate is added in an amount such that the molar amount of phosphorus contained in the moulding composition is at least equal to the molar amount of copper contained in the moulding composition and at most equal to five times the molar amount of copper contained in the moulding composition.

Polyamides used in the thermoplastic polyamide moulding compositions are in general aliphatic polyamides or polyamides in which the major proportion of the compound is aliphatic. Polyamide 6 or polyamide 66 or copolyamides of polyamide 6 with diamines (preferably $C_4$–$C_{16}$, in particular $C_4$–$C_8$-alkylene-diamines) and dicarboxylic acids (preferably $C_4$–$C_{12}$, in particular $C_4$–$C_8$-alkylene-dicarboxylic acids) or polyamide 66 with a maximum amount of comonomer of 20 wt. % are preferably used.

Polyamide moulding compositions according to the invention may contain additives. The additives may be, for example: fibrous or particulate fillers or reinforcing agents such as, for example, glass fibres, glass beads or mineral fillers; processing aids such as, for example, lubricants, nucleating agents; flame retardants; impact resistance modifiers such as, for example, polyolefins or other rubbers; substances which provide colour or other conventional additives. The additives are added in conventional amounts. Fillers, and reinforcing agents and impact resistance modifiers are generally added in an amount of up to 60, preferably 5 to 40 wt. %.

Addition of the substances which are used to stabilise the moulding compositions can take place in a variety of ways.

The stabilisers may be added to the monomers, for example, before or during polymerisation. The stabilisers may be added to the polymers, for instance, before, at the same time as or after addition of other additives. The stabilisers may be incorporated into the polymer melts, for example, by means of an extruder or in another way. The stabilisers may also be applied, however, to the surface of the solid polymer present as granules or in any others form or to the surface of the solid moulding compositions. The stabilisers are preferably incorporated in the polymer melt using an extender.

Polyamide moulding compositions according to the invention are suitable for many applications. They may be used, for example, to produce fibres, moulded items, semi-finished products or films. The fibres, moulded items, semi-finished products or films may be prepared by spinning, injection moulding, extruding, blow moulding or by other conventional methods.

EXAMPLES

In the following Tables, the amounts of feed materials are given in wt. %. In the case of copper(I) iodide, in addition to the amount of copper(I) iodide in wt. %, the corresponding amount of copper is also given in wt. % (1 wt. % of copper(I) iodide corresponds to 0.334 wt. % of copper). In addition, the amount of stabiliser components in mmol per 100 g of moulding composition is given in brackets.

The feed materials were mixed and extruded with a twin-screw extender (ZSK 32 from Werner and Pfleiderer). The extrudates obtained in this way were granulated. Rods with the dimensions 80 mm×10 mm×4 mm were prepared from the granulate by injection moulding. These rods were subjected to thermal ageing at 150° C. in an atmosphere of air. The ageing process of the moulding compositions was followed by measuring the Izod ($a_n$) impact resistance. Examples 1 to 6, 10 to 15 and 19 to 22 are comparison examples.

| | Comparison | | | | | | According to the invention | | |
|---|---|---|---|---|---|---|---|---|---|
| Example | 1 | 2 | 3 | 4 | 5 | 6 | 7 | 8 | 9 |
| polyamide 6 in wt. % | 70.00 | 69.80 | 69.60 | 69.60 | 69.75 | 69.595 | 69.65 | 69.55 | 69.49 |
| glass fibres in wt. % | 30.00 | 30.00 | 30.00 | 30.00 | 30.00 | 30.00 | 30.00 | 30.00 | 30.00 |
| copper iodide in wt. % | 0.00 | 0.05 | 0.05 | 0.05 | 0.05 | 0.05 | 0.05 | 0.05 | 0.05 |
| i.e. copper in wt. % | 0.00 | 0.017 | 0.017 | 0.017 | 0.017 | 0.017 | 0.017 | 0.017 | 0.017 |
| (mmol of copper) | (0.00) | (0.268) | (0.268) | (0.268) | (0.268) | (0.268) | (0.268) | (0.268) | (0.268) |
| potassium iodide in wt. % | 0.00 | 0.15 | 0.25 | 0.35 | 0.15 | 0.35 | 0.25 | 0.35 | 0.35 |
| mmol of iodine (total iodine content from CuI and KI) | (0.00) | (1.172) | (1.778) | (2.388) | (1.208) | (2.388) | (1.778) | (2.388) | (2.388) |
| sodium hypophosphite in wt. % | 0.00 | 0.00 | 0.00 | 0.00 | 0.05 | 0.005 | 0.05 | 0.05 | 0.11 |
| (mmol of phosphorus) | (0.00) | (0.00) | (0.00) | (0.00) | (0.568) | (0.057) | (0.568) | (0.568) | (1.25) |
| Molar ratio Cu:I:P | — | 1:4.4:0 | 1:6.6:0 | 1:8.9:0 | 1:4.4:2.1 | 1:8.9:0.2 | 1:6.6:2.1 | 1:8.9:2.1 | 1:8.9:4.7 |
| $a_n$ after 0 hours | 63 | 65 | 65 | 64 | 70 | 69 | 68 | 69 | 69 |
| $a_n$ after 500 hours | 33 | 44 | 54 | 61 | 53 | 54 | 59 | 60 | 62 |
| $a_n$ after 1000 hours | 26 | 31 | 32 | 33 | 37 | 37 | 40 | 43 | 50 |

| | Comparison | | | | | | According to the invention | | |
|---|---|---|---|---|---|---|---|---|---|
| Example | 10 | 11 | 12 | 13 | 14 | 15 | 16 | 17 | 18 |
| polyamide 66 in wt. % | 70.00 | 69.80 | 69.60 | 69.60 | 69.75 | 69.595 | 69.65 | 69.55 | 69.49 |
| glass fibres in wt. % | 30.00 | 30.00 | 30.00 | 30.00 | 30.00 | 30.00 | 30.00 | 30.00 | 30.00 |
| copper iodide in wt. % | 0.00 | 0.05 | 0.05 | 0.05 | 0.05 | 0.05 | 0.05 | 0.05 | 0.05 |
| i.e. copper in wt. % | 0.00 | 0.017 | 0.017 | 0.017 | 0.017 | 0.017 | 0.017 | 0.017 | 0.017 |
| (mmol of copper) | (0.00) | (0.268) | (0.268) | (0.268) | (0.268) | (0.268) | (0.268) | (0.268) | (0.268) |
| potassium iodide in wt. % | 0.00 | 0.15 | 0.25 | 0.35 | 0.15 | 0.35 | 0.25 | 0.35 | 0.35 |
| mmol of iodine (total iodine content from CuI and KI) | (0.00) | (1.172) | (1.778) | (2.388) | (1.208) | (2.388) | (1.778) | (2.388) | (2.388) |
| sodium hypophosphite in wt. % | 0.00 | 0.00 | 0.00 | 0.00 | 0.05 | 0.005 | 0.05 | 0.05 | 0.11 |
| (mmol of phosphorus) | (0.00) | (0.00) | (0.00) | (0.00) | (0.568) | (0.057) | (0.568) | (0.568) | (1.25) |
| Molar ratio Cu:I:P | — | 1:4.4:0 | 1:6.6:0 | 1:8.9:0 | 1:4.4:2.1 | 1:8.9:0.2 | 1:6.6:2.1 | 1:8.9:2.1 | 1:8.9:4.7 |
| $a_n$ after 0 hours | 61 | 63 | 65 | 64 | 64 | 69 | 66 | 66 | 70 |
| $a_n$ after 500 hours | 28 | 33 | 46 | 38 | 62 | 54 | 65 | 65 | 68 |
| $a_n$ after 1000 hours | 21 | 21 | 34 | 35 | 36 | 37 | 45 | 46 | 56 |

| Comparison example | 19 | 20 | Comparison example | 21 | 22 |
|---|---|---|---|---|---|
| polyamide 6 in wt. % | 68.60 | 68.72 | polyamide 66 in wt. % | 68.60 | 68.72 |
| glass fibres in wt. % | 30.00 | 30.00 | glass fibres in wt. % | 30.00 | 30.00 |
| copper acetate in wt. %, | 0.15 | 0.03 | copper iodide in wt. %, | 0.15 | 0.03 |
| i.e. copper in wt. % | i.e. 0.052 | i.e. 0.010 | i.e. copper in wt. % | i.e. 0.052 | i.e. 0.010 |
| (mmol of copper) | (0.819) | (0.157) | (mmol of copper) | (0.819) | (0.157) |
| potassium iodide in wt. % | 1.00 | 1.00 | potassium iodide in wt. % | 1.00 | 1.00 |
| (mmol of iodine) | (6.02) | (6.02) | (mmol of iodine) | (6.02) | (6.02) |
| phosphorous acid in wt. % | 0.25 | 0.00 | phosphorous acid in wt. % | 0.25 | 0.00 |
| (mmol of phosphorus) | (3.05) | (0.00) | (mmol of phosphorus) | (3.05) | (0.00) |
| sodium dihydrogen phosphate in wt. % | 0.00 | 0.25 | sodium dihydrogen phosphate in wt. % | 0.00 | 0.25 |
| (mmol of phosphorus) | (0.00) | (2.08) | (mmol of phosphorus) | (0.00) | (2.08) |
| Molar ratio Cu:I:P | 1:7.4:3.7 | 1:38:13 | Molar ratio Cu:I:P | 1:7.4:3.7 | 1:38:13 |
| $a_n$ after 0 hours | 53 | 61 | $a_n$ after 0 hours | 58 | 65 |
| $a_n$ after 500 hours | 52 | 49 | $a_n$ after 500 hours | 48 | 53 |
| $a_n$ after 1000 hours | 30 | 35 | $a_n$ after 1000 hours | 33 | 38 |

The Tables show that the percentage retention of impact resistance after 1000 hours ageing for examples according to the invention is greater than that for the comparison examples.

What is claimed is:

1. A thermoplastic polyamide moulding composition comprising a stabilizer system, said stabilizer system consisting essentially of a mixture of:

(A) a copper halide, and at least one other halogen compound; and (B) hypophosphorous acid, or an alkali metal salt of hypophosphorous acid, or an alkaline earth metal salt of hypophosphorous acid;

wherein the individual components of the stabilizer system are present in amounts such that:

(1) the molar amount of halogen contained in the thermoplastic polyamide moulding composition is from about 6.6 to 8.9 times the molar amount of copper contained in the thermoplastic polyamide moulding composition; and (2) the molar amount of phosphorous contained in the thermoplastic polyamide moulding, composition is from about 2.1 to 4.7 times the molar amount of copper contained in the thermoplastic polyamide moulding composition.

2. The thermoplastic polyamide moulding composition of claim 1, wherein the at least one other halogen compound is selected from the group consisting of sodium halide and potassium halide.

3. The thermoplastic polyamide moulding composition of claim 2, wherein the thermoplastic polyamide moulding composition contains from about 0.01 to 0.5 weight percent of copper iodide, sodium iodide, or potassium iodide.

4. The thermoplastic polyamide moulding composition of claim 1, wherein the stabilizer system contains from about 0.05 to 0.11 weight percent sodium hypophosphite.

5. The thermoplastic polyamide moulding composition of claim 1, wherein the thermoplastic polyamide moulding composition contains from about 0.001 to 1 weight percent copper.

6. The thermoplastic polyamide moulding composition of claim 1, wherein the thermoplastic polyamide moulding composition contains from about 0.003 to 0.3 weight percent copper.

7. The thermoplastic polyamide moulding composition of claim 1, further comprising at least one additive selected from the group consisting of fillers, reinforcing agents, processing aids, flame retardants, pigments, dyes, and impact resistance modifiers.

* * * * *